March 20, 1928.

J. O. JOHNSON

SCREW THREAD TOLERANCE INDICATOR

Filed Sept. 26, 1925

1,663,341

Inventor
J. O. Johnson
By W. M. Roach
Attorney

Patented Mar. 20, 1928.

1,663,341

UNITED STATES PATENT OFFICE.

JOHN O. JOHNSON, OF NEW HAVEN, CONNECTICUT.

SCREW-THREAD TOLERANCE INDICATOR.

Application filed September 26, 1925. Serial No. 58,773.

The subject of this invention is a screw thread tolerance indicator.

In preparing specifications for screw threads, designers are very prone to call for minimum tolerances when greater tolerances may fully meet the requirements of the situation and similarly they are inclined to err in distinguishing the proper application of fine and coarse threads.

With a view towards aiding the designer in selecting the correct screw thread for the purpose in view and in eliminating unnecessary precision, I have devised a ring and plug tolerance indicator which are formed with complementary cutaway portions without interrupting the continuity of the ring for presenting a clearly defined and easily interpretable sectionalized view of the engaging screw threads.

To these and other ends, my invention consists in the construction, arrangement, and combination of elements, described hereinafter and pointed out in the claims forming a part of this specification.

A practical embodiment of the invention is illustrated in the accompanying drawings, wherein.

Figure 1:
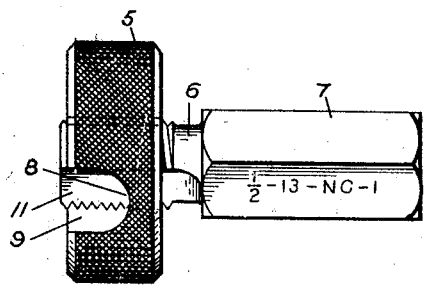
Fig. 1 is a plan view of the ring and plug assembly looking into the sight opening.
Figure 2:
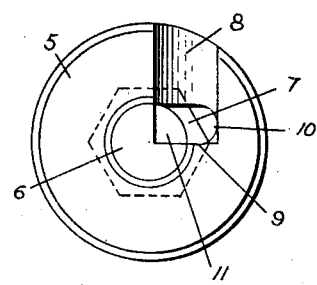
Fig. 2 is a front end view thereof.
Figure 3:
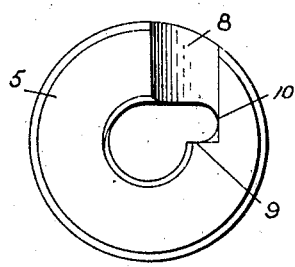
Fig. 3 is a front view of the ring.
Figure 4:
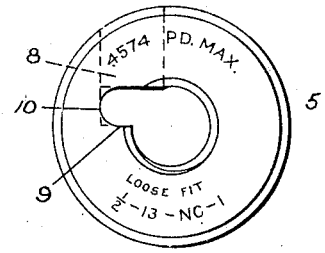
Fig. 4 is a rear view thereof.
Figure 5:
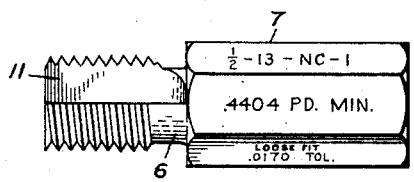
Fig. 5 is a detail view of the plug.
Figure 6:
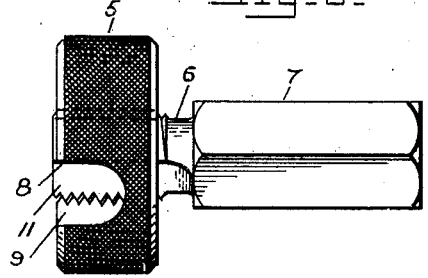
Fig. 6 is a view similar to Fig. 1 illustrating a loose fit.

Referring to the drawings by numerals of reference:

The improvements forming the subject of the invention may be incorporated in a conventional gage set consisting of an internally screw threaded ring 5 and an externally threaded plug 6 provided with a handle 7.

Taking up first the ring, this member is formed with a sight opening 8 constituted by a groove directed to intersect the bore and preferably terminating in a plane face 9, the line defining the juncture of said face with the wall of the bore being substantially parallel to the axis of bore, whereby a clear cross sectional view of the threads is presented. The opening 8 is preferably marginal to facilitate inspection and not being a complete section through the ring the rigidity of the ring is preserved.

A second opening 10 communicating with the sight opening and peripheral to the bore may be provided to admit light and complete the sectional view of the threaded portion of the ring. The opening 10 may of itself be regarded as a sight opening although not affording as clear a view as when the opening 8 is included by the reason of the angle of sight.

The plug 6 is formed with a longitudinal groove 11 located in the threaded portion of the plug, which groove is adapted to be brought into register with the sight opening when the fit of the thread is to be inspected. This groove is, preferably, as herein shown of angular formation and extends throughout the threaded portion of the plug, however, such formation is not essential as any groove or cut which will facilitate inspection of the threads will answer the purpose of the invention.

Both the ring and the plug are inscribed with appropriate data referring to pitch diameter, pitch difference, degree of fit as close, medium, free, or loose, and other pertinent information referring to the particular screw thread table employed.

In the present instance, a complete set of tolerance indicators consists of eight ring and plug units having four degrees of fit in both a fine and coarse thread.

If desired, the ring and plug may be independently used as gages for testing finished work, the openings in each member permitting visible inspection of the engaging screw threads.

While the groove in the plug will not, in many instances, permit occular inspection of the engagement of all threads with those of an interiorly threaded member, it will permit at least several of the end threads to be seen thereby assisting in the gaging operation.

While in the foregoing there has been illustrated and described such combinations and arrangement of elements as constitute the preferred embodiment of my invention, it is nevertheless desired to emphasize the fact that interpretation of the invention should only be conclusive when made in the light of the subjoined claims.

I claim:

1. A screw thread tolerance indicator including a threaded ring and plug, said ring formed with a marginal sight opening intersecting the bore and terminating in a plane face, the line defining the juncture of said face with the wall of the bore being substantially parallel to the axis of the bore and with a second opening communicating with the sight opening and peripheral to the bore, said plug sectioned in the threaded portion thereof to provide a face adapted to be brought into the plane of the aforesaid face.

2. A screw thread tolerance indicator including a threaded ring and plug, said ring formed with a sight opening intersecting the bore, one wall of said opening being a plane face, the line defining the intersection of such face with the wall of the bore being substantially parallel to the axis of the bore, and with a second opening communicating with the sight opening and peripheral to the bore, said plug sectioned in the threaded portion thereof to provide a face adapted to be brought into the plane of the aforesaid face.

3. A screw thread tolerance indicator including a ring provided with a threaded bore, said ring formed with a sight opening constituted by a groove in one end face of the ring intersecting the bore, and with a second opening communicating with the sight opening and peripheral to the bore, said second opening terminating at the other end face of the ring.

4. A screw thread tolerance indicator including a threaded ring and plug, said ring formed with a sight opening intersecting the bore and with a second opening communicating with the sight opening and peripheral to the bore, and said plug sectioned in the threaded portion thereof, the sectioned portion adapted to be brought into position to be viewed through the sight opening.

5. A screw thread tolerance indicator including a threaded ring and plug, said ring formed with a sight opening intersecting the bore, and said plug sectioned in the threaded portion thereof, the sectioned portion adapted to be brought into position to be viewed through the sight opening.

6. A screw thread tolerance indicator including a threaded ring and plug, said ring formed with a sight opening peripheral to the bore, and said plug sectioned complementarily to the ring opening.

7. A screw thread tolerance indicator embodying, a ring provided with a threaded bore, a threaded plug adapted to engage the threads of the ring, and cooperating means on the ring and plug to permit inspection of the tolerance fit of the threads.

8. A screw thread tolerance indicator embodying, a ring provided with a threaded bore, a threaded plug adapted to engage the threads of the ring and means on the ring to permit inspection of the tolerance fit of the threads.

JOHN O. JOHNSON.